(12) United States Patent
R et al.

(10) Patent No.: US 10,440,497 B2
(45) Date of Patent: Oct. 8, 2019

(54) MULTI-MODAL DEREVERBARATION IN FAR-FIELD AUDIO SYSTEMS

(71) Applicant: Intel Corporation, Santa Clara, CA (US)

(72) Inventors: Raghavendra Rao R, Bangalore (IN); Przemyslaw Maziewski, Gdansk (PL); Adam Kupryjanow, Gdansk (PL); Anbumani Subramanian, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/815,763

(22) Filed: Nov. 17, 2017

(65) Prior Publication Data

US 2019/0028829 A1   Jan. 24, 2019

(51) Int. Cl.
*H04S 7/00* (2006.01)
*G06T 7/62* (2017.01)
*G06T 17/00* (2006.01)

(52) U.S. Cl.
CPC ............... *H04S 7/305* (2013.01); *G06T 7/62* (2017.01); *G06T 17/00* (2013.01); *G06T 2207/10004* (2013.01); *H04S 7/303* (2013.01)

(58) Field of Classification Search
CPC . G06T 7/62; G06T 17/00; G06T 2207/10004; H04S 7/305
See application file for complete search history.

(56) References Cited

U.S. PATENT DOCUMENTS

| | | | | |
|---|---|---|---|---|
| 9,980,076 | B1* | 5/2018 | Pratt | H04S 7/303 |
| 9,998,847 | B2* | 6/2018 | Norris | H04S 7/304 |
| 2003/0007648 | A1* | 1/2003 | Currell | H04S 7/30 381/61 |
| 2010/0104114 | A1* | 4/2010 | Chapman | H04S 7/305 381/103 |
| 2014/0133683 | A1* | 5/2014 | Robinson | H04S 3/008 381/303 |
| 2014/0140525 | A1* | 5/2014 | Satou | G10K 11/175 381/71.3 |
| 2014/0200887 | A1* | 7/2014 | Nakadai | G10L 15/20 704/233 |
| 2014/0348357 | A1* | 11/2014 | Liang | H04S 7/305 381/303 |
| 2015/0271620 | A1* | 9/2015 | Lando | H04S 5/005 381/18 |
| 2016/0337779 | A1* | 11/2016 | Davidson | H04S 7/304 |
| 2018/0139565 | A1* | 5/2018 | Norris | H04S 7/304 |
| 2018/0195273 | A1* | 7/2018 | Mauer | E04B 1/86 |

* cited by examiner

*Primary Examiner* — Mohammad K Islam
(74) *Attorney, Agent, or Firm* — Jaffery Watson Mendosa & Hamilton LLP

(57) ABSTRACT

A mechanism is described for facilitating multi-modal dereverberation in far-field audio systems according to one embodiment. A method of embodiments, as described herein, includes performing geometry estimation of a geographical space based on visuals of the space received from one or more cameras of a computing device. The method may further include computing reverberation time based on the geometry estimation that is further based on the visuals, and computing and applying dereverberation based on the reverberation time.

15 Claims, 8 Drawing Sheets

MULTI-MODAL DEREVERBARATION IN FAR-FIELD AUDIO SYSTEMS

FIELD

Embodiments described herein relate generally to data processing and more particularly to facilitate multi-modal dereverberation in far-field audio systems.

BACKGROUND

There are several conventional techniques for reducing reverberation in audio signals; however, such conventional techniques entirely depend on audio inputs and audio-based estimations, which often require repetition and can be inefficient, cumbersome, prone to error.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
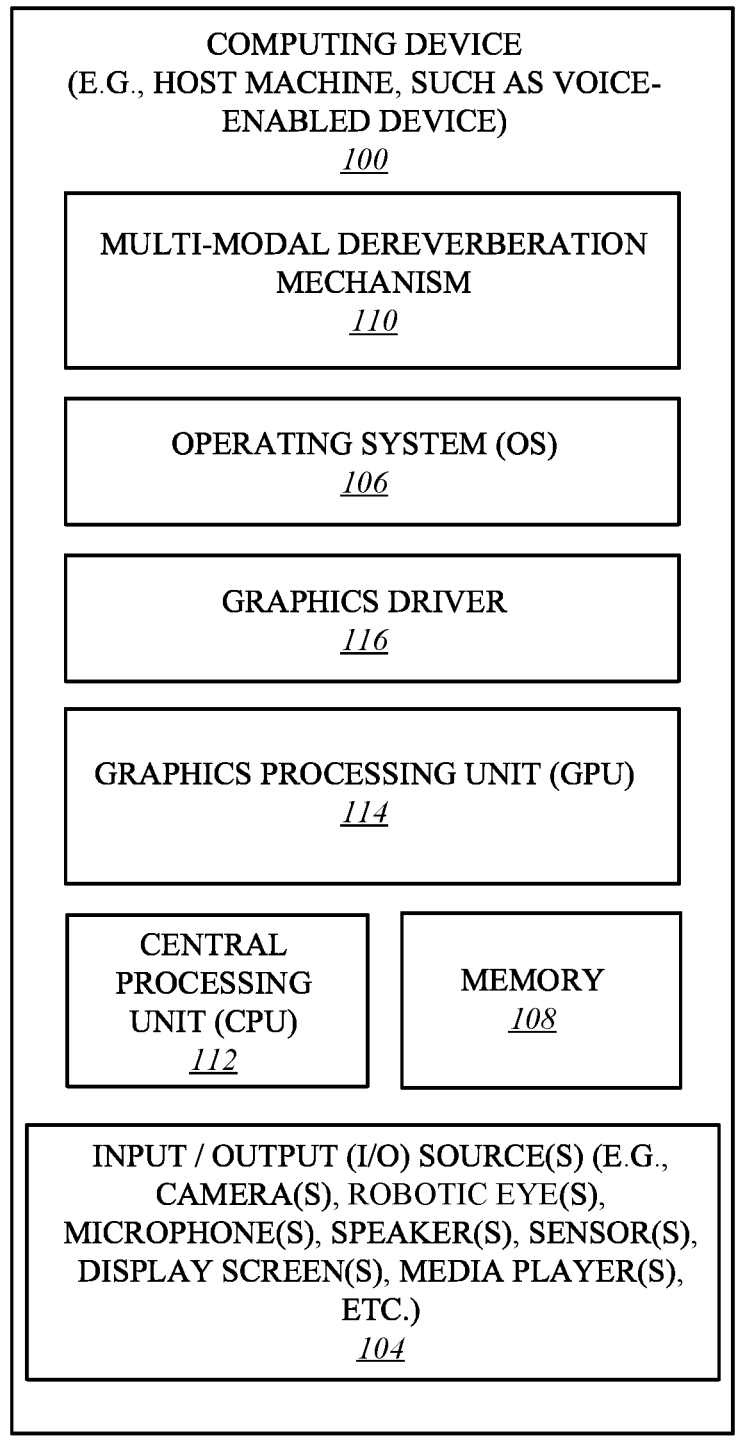
FIG. 1 illustrates a computing device hosting a multi-modal dereverberation mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for supplementing visual inputs and estimations to dereverberation processes of audio signals. In one embodiment, video and/or image capturing components, such as cameras, are used to help build a three-dimensional (3D) model of a room where a voice-enabled device is placed, where the video/image inputs captured by such cameras are then used as information for dereverberation in audio systems.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a multi-modal dereverberation mechanism ("dereverberation mechanism") 110 according to one embodiment. Computing device 100 represents a communication and data processing device including or representing (without limitations) a voice-enabled device (VED), a voice command device (VCD), and/or the like. Throughout this document, computing device 100 may be interchangeably referred to as "smart voice device" or "smart voice-enabled device" or simply "voice-enabled device" or "voice device" that includes or works with or is embedded in or facilitates any number and type of smart devices, such as (without limitation) smart command devices or intelligent personal assistants (e.g., Echo® by Amazon.com®, etc.), home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, voice-enabled device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, voice-enabled device 100 may include a computer platform hosting an integrated circuit ("IC"), such as a system on a chip ("SoC" or "SOC"), integrating various hardware and/or software components of voice-enabled device 100 on a single chip.

As illustrated, in one embodiment, voice-enabled device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Voice device 100 may include operating system (OS) 106 serving as an interface between hardware and/or physical resources of the voice-enabled device 100 and a user.

It is to be appreciated that a lesser or more equipped system than the example described above may be preferred for certain implementations. Therefore, the configuration of voice-enabled device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, dereverberation mechanism 110 may be hosted by operating system 106 in communication with I/O source(s) 104, such as microphone(s), of voice-enabled device 100. In another embodiment, dereverberation mechanism 110 may be hosted or facilitated by graphics driver 116. In yet another embodiment, dereverberation mechanism 110 may be hosted by or part of graphics processing unit ("GPU" or simply graphics processor") 114 or firmware of graphics processor 114. For example, dereverberation mechanism 110 may be embedded in or implemented as part of the processing hardware of graphics processor 114. Similarly, in yet another embodiment, dereverberation mechanism 110 may be hosted by or part of central processing unit ("CPU" or simply "application processor") 112. For example, dereverberation mechanism 110 may be embedded in or implemented as part of the processing hardware of application processor 112.

In yet another embodiment, dereverberation mechanism 110 may be hosted by or part of any number and type of components of voice-enabled device 100, such as a portion of dereverberation mechanism 110 may be hosted by or part of operating system 116, another portion may be hosted by or part of graphics processor 114, another portion may be hosted by or part of application processor 112, while one or more portions of dereverberation mechanism 110 may be hosted by or part of operating system 116 and/or any number and type of devices of computing device 100. It is contemplated that embodiments are not limited to any particular implementation or hosting of dereverberation mechanism 110 and that one or more portions or components of dereverberation mechanism 110 may be employed or implemented as hardware, software, or any combination thereof, such as firmware.

Voice-enabled device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
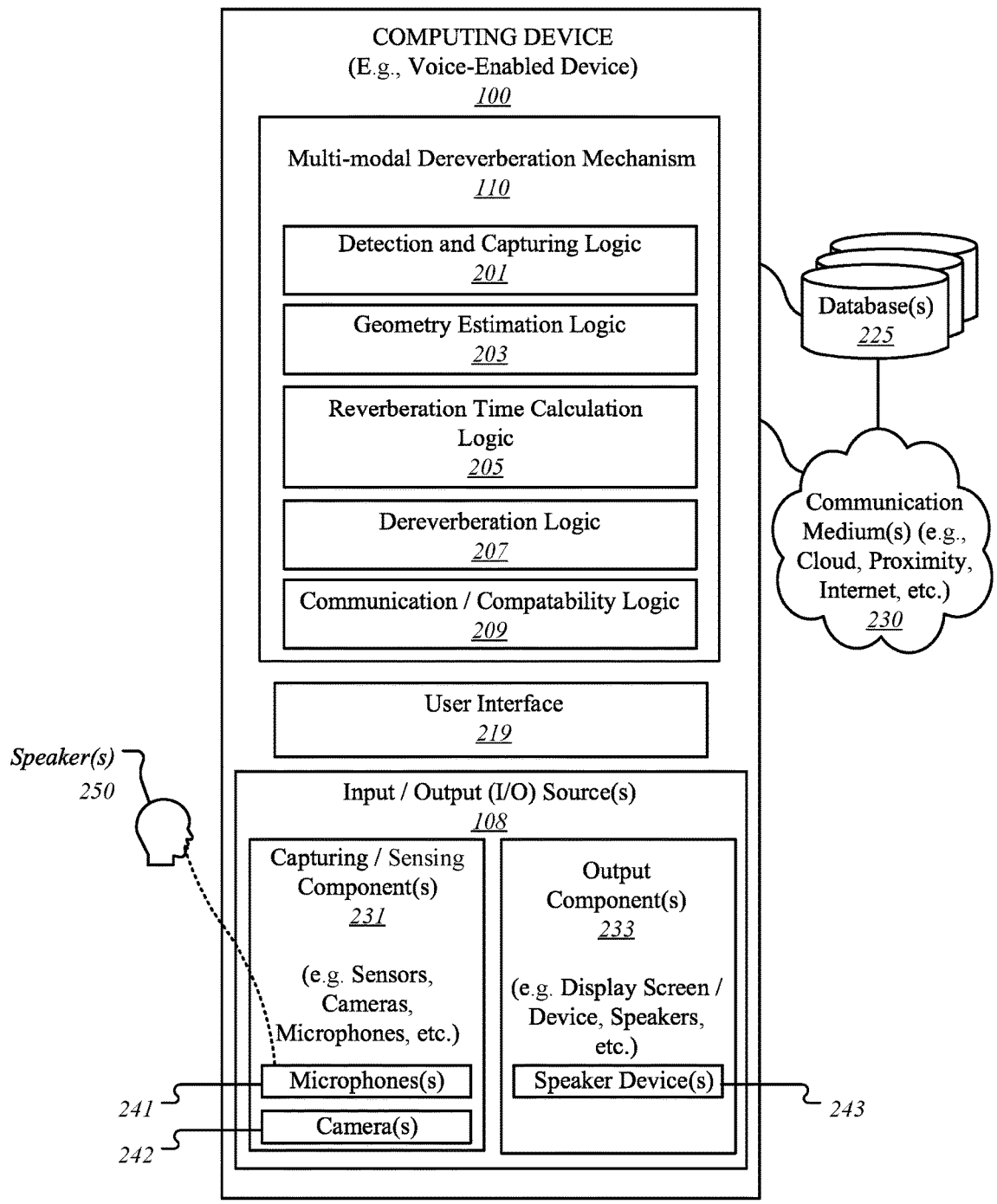
FIG. 2 illustrates the multi-modal dereverberation mechanism of FIG. 1 according to one embodiment.

FIG. 2 illustrates multi-modal dereverberation mechanism 110 of FIG. 1 according to one embodiment. For brevity, many of the details already discussed with reference to FIG. 1 are not repeated or discussed hereafter. In one embodiment, dereverberation mechanism 110 may include any number and type of components, such as (without limitations): detection and capturing logic 201; geometry estimation logic ("estimation logic") 203; reverberation time calculation logic ("time calculation logic") 205; dereverberation logic 207; and communication/compatibility logic 209.

Voice-enabled device 100 is further shown to include user interface 219 (e.g., graphical user interface (GUI)-based user interface, Web browser, cloud-based platform user interface, software application-based user interface, other user or application programming interfaces (APIs), etc.). Voice-enabled device 100 may further include I/O source(s) 108 having capturing/sensing component(s) 231, such as camera(s) 242 (e.g., Intel® RealSense™ camera), sensors, microphone(s) 241, etc., and output component(s) 233, such as display(s) (e.g., integral displays, tensor displays, projection screens, display screens, etc.), speaker devices(s) or simply speaker(s) 243, etc.

Voice-enabled device 100 is further illustrated as having access to and/or being in communication with one or more database(s) 225 and/or one or more of other computing devices over one or more communication medium(s) 230 (e.g., networks such as a cloud network, a proximity network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, voice-enabled device 100 may host I/O sources 108 including capturing/sensing component(s) 231 and output component(s) 233. In one embodiment, capturing/sensing component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display devices or screens, projectors, speakers, light-emitting diodes (LEDs), speaker(s) 243, and/or vibration motors, etc.

For example, as illustrated, capturing/sensing component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into voice-enabled device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into voice-enabled device 100.

It is contemplated that embodiments are not limited to any number or type of microphone(s) 241, camera(s) 243, speaker(s) 243, etc. For example, as facilitated by detection and capturing logic 201, one or more of microphone(s) 241 may be used to detect speech or sound simultaneously from multiple users or speakers, such as speaker 250. Similarly, as facilitated by detection and capturing logic 201, one or more of camera(s) 242 may be used to capture images or videos of a geographic location (such as a room) and its contents (e.g., furniture, electronic devices, humans, animals, plats, etc.) and form a set of images or a video stream form the captured data for further processing by dereverberation mechanism 110 at voice-enabled device 100.

Similarly, as illustrated, output component(s) 233 may include any number and type of speaker device(s) or speaker(s) 243 to serve as output devices for outputting or giving out audio from voice-enabled device 100 for any number or type of reasons, such as human hearing or consumption. For example, speaker(s) 243 work the opposite of microphone(s) 241 where speaker(s) 243 convert electric signals into sound.

To avoid any potential confusion of terms, it is contemplated and to be noted that "speaker(s)" 250 refers to users or individuals or humans who speak into voice-enabled device 100 using their voices or sounds, while "speakers" or "speaker device(s)" 243 are part of output component(s) 233 and refer to one or more output devices coupled to or embedded into voice-enabled device 100 to convert electric signals into sound.

Figure 3A:
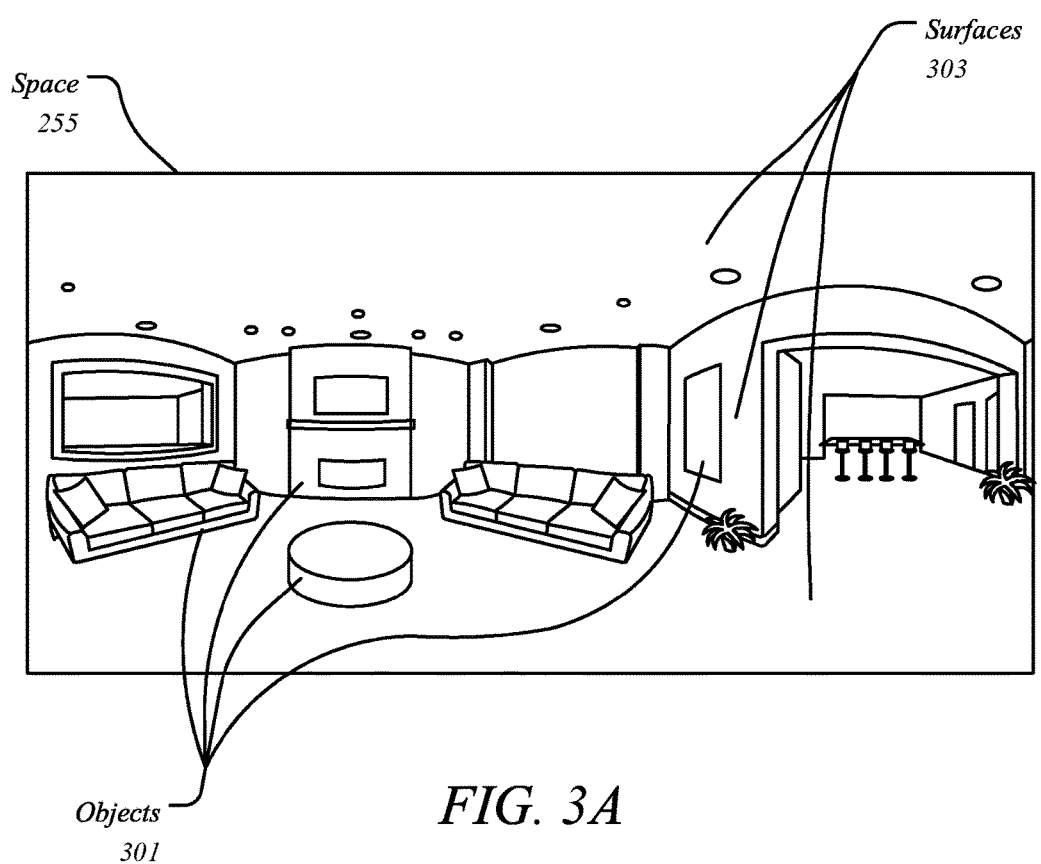
FIG. 3A illustrates a captured view of a geographic/physical space according to one embodiment.

In some embodiments, voice-enabled device 100 may be placed within a geographic area or a physical space, such as a room, a building, a hall, a stadium, etc., and, as shown in the illustrated embodiment, camera(s) 242 may be used to capture all or any one or more portions of the space, such as captured view 255 of a portion of a room as further illustrated in FIG. 3A, in which voice-enabled device 100 is placed.

As aforementioned, conventional voice-enabled smart assistant device use audio for user interaction and rely on far-field audio signal processing for understanding voice commands given by the user. A signal processing chain may include certain processes or stages, such as direct current (DC) removal and gain, dereverberation, and beam forming. There having been approaches to reduce reverberation in audio signals through known signal processing reverberation reduction algorithms; however, none of the conventional techniques allow for or accommodate visual estimations (e.g., camera-based image capturing, video capturing, etc.) or surface area mapping, such as an input to a dereverberation signal processing block.

Embodiments provide for a novel technique to employ camera(s) 242 as part of or in communication with voice-enabled device 100 so that one or more of camera(s) 242 may be used to allow for augmentation of vision and other sensors, where available, to then be used for dereverberation process of audio signals as facilitated by dereverberation mechanism 110.

It is contemplated that in acoustics (and psychoacoustics), reverberation is a resonance or a prolongation of a sound having a continuing effect or repercussion. In other words, reverberation refers to the persistence of sound after a sound has been produced. This reverberation can have a large reflection built up that is then followed by gradual decay with time as the reflective sounds is absorbed by objects and/or surfaces of the space.

It is further contemplated that reverberation time may depend on the size of the space (also referred to as "room") along with its shape, interior materials of objects and surfaces, etc. For example, reverberation time may be estimated using merely the size of the space based on certain assumptions, such as typical shapes of the space (e.g., square office room, rectangle living room, etc.), standard interior objects (e.g., wooden furniture, paper books, etc.), expected surfaces (e.g., gypsum walls, carpeted bedroom floor, tiled bathroom floor, etc.), and/or the like.

Accordingly, for example, if the size of a room is estimated and the resulting reverberation time is provided to dereverberation mechanism 110, the dereverberation process may be augmented by selecting optimal dereverberation filter length based on the knowledge of the characteristics of the room. The size of the room may be estimated using any known technologies, such as simultaneous localization and mapping (SLAM) for multiple images captured by camera(s) 242, such as depth cameras, RealSense™ cameras, binoculars, or any other form or type of camera arrays. Similarly, for example, the surface of the walls in the room may be estimated through camera(s) 242 or other forms or types of sensors, such as ultrasound or Light Detection and Ranging (LIDAR)-based techniques to aid with the dereverberation process.

In one embodiment, voice-enabled device 100 having camera(s) 242 may be used to provide a 360-degree view of the scene, such captured view 255, as facilitated by detection and capturing logic 201, where this captured view 255 may then be used by dereverberation mechanism 110 for efficient reduction in dereverberation through room geometry estimation by estimation logic 203, reverberation time calculation by time calculation logic 205, and dereverberation reduction by dereverberation logic 207.

For example, a 360-degree view of space, such as captured view 255 of a room, may be obtained using a single omni-directional camera of camera(s) 242 or multiple cameras of camera(s) 242 placed in a circular setup. With such a camera setup, multiple images of the room may be obtained during an initial, one-time speaker-placement process. This one-time process may be in line with compass-calibration process used in mobile phones, where a mobile phone is expected to move-around in an 8-like path to offset any errors in compass bias.

Then, these multiple images may be used to build a three-dimensional (3D) model of the room using techniques like SLAM, where the 3D model of the room may then be used to estimate the room geometry as facilitated by geometry estimation logic 203. This room geometry estimation may include (but not limited to) distance to or from walls, distance to and from ceiling, distances between objects in the room, etc. In one embodiment, estimation of room geometry may be used by geometry estimation logic 203 to build an acoustic model of the overall environment of the room and subsequently, as facilitated by time calculation logic 205, reverberation time for a known signal may be calculated based on the room geometry.

Further, for example, the following information may be obtained from the 3D model: 1) estimating lengths and breadths of the room to an accuracy of +/−1 foot; 2) identifying corners of the room; 3) estimating height of the room; 4) locating various openings, such as doors, windows, walkways, etc.; 5) locating various positions of items or objects in the room, such as sofa, tables, etc.; and 6) identifying various surfaces the room and their material, such as wooden, marble, tiled, etc.

In one embodiment, a room 3D model may be built using the relative location of voice-enabled device 100 with the room, where voice-enabled device 100 is used as the reference origin. Further, one or more secondary sensors of capturing/sensing component(s) 231 may be used for determination of various surfaces to augment any information obtained from camera(s) 242. In the cases of an external connected 360-degree camera of camera(s) 242, a 3D model may be constructed with camera(s) 242 as the reference origin, while the exact location of voice-enabled device 100 in the room is determined.

Referring now to reverberation time calculation, in one embodiment, time calculation logic 205 may be used to estimate the reverberation time according to the following formula or equation:

$$RT60(f) = \frac{0.163}{[m/s]} \frac{V}{\alpha(f)s} [s]$$

(for brevity, referenced as "formula 1").

Where V refers to the volume of the space or room [m3], S refers to an area of all surfaces (e.g., walls, floors, and ceiling, etc.) [m$^2$], α refers to the mean absorption coefficient of all surfaces, and f refers to the frequency band [Hz], such as in octave scale, the mid-frequencies may equal the following: 125, 250, 500, 1000, 2000, 4000 Hz.

Figure 3B:
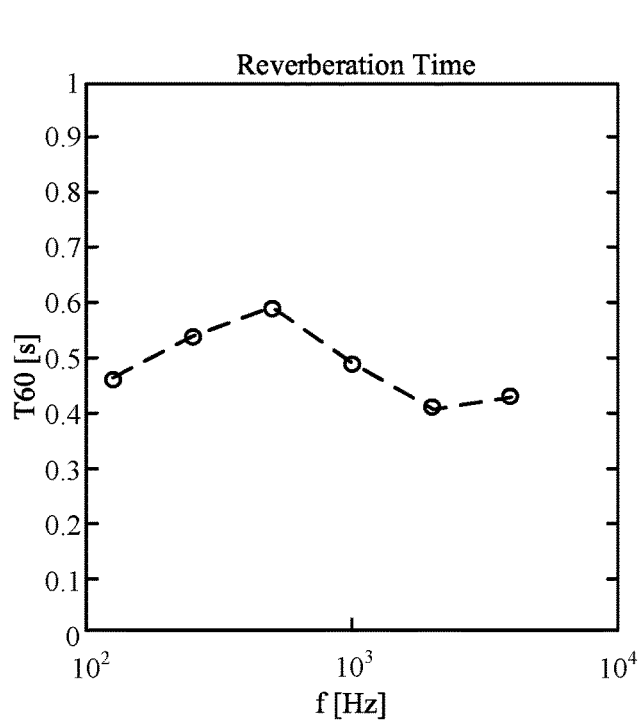
FIGS. 3B-3C illustrate graphs according to one embodiment.

Now, for example, if a typical living room is of size 4.2 meters in length, 3.4 meters in width, and 3.2 meters in height, then the reverberation time, RT60, may equal 0.46 seconds, 0.54 seconds, 0.59 seconds, 0.49 seconds, 0.41 seconds, and 0.43 seconds for consecutive octaves, f, as shown in FIG. 3B. In one embodiment, using the above-referenced formula 1, a mean absorption coefficient may be calculated as follow:

$$\alpha(f) = \frac{0.163}{[m/s]} \frac{V}{RT60(f)s}$$

(for brevity, referenced as "formula 2").

Figure 3C:
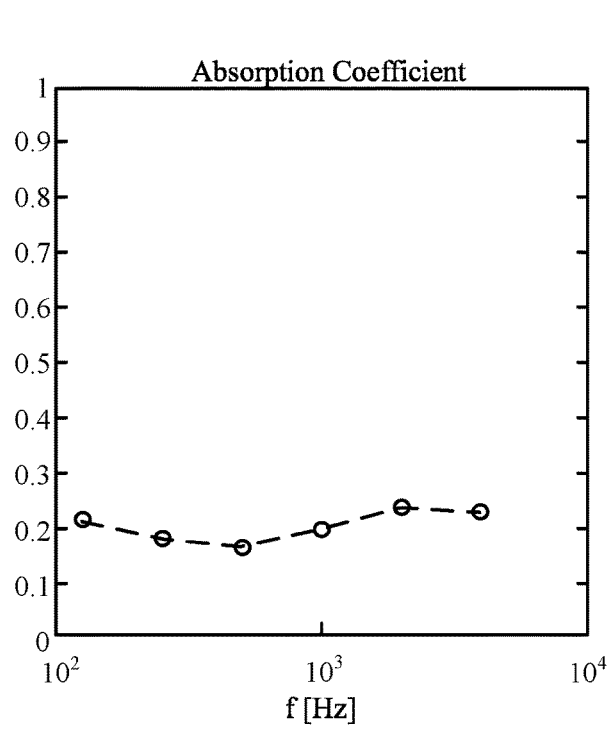

Where, as shown in FIG. 3C, the corresponding absorption coefficients, α, may equal 0.2097, 01787, 0.1635, 0.1969, 0.2353, and 0.2244.

Assuming the mean absorption coefficient as calculated above, RT60 may be estimated as having both the V and S; alternatively, additional simplifications may be performed. For example, if the room proportions are known, such as w=p1l, h=p2l, S may be estimated from V using the following formulae:

$$l = \sqrt[3]{\frac{V}{p_1 p_2}}$$

(for brevity, referenced as "formula 3"); and

S=2l$^2$(p$_1$/p$_1$p$_2$+p$_2$) (for brevity, referenced as "formula 4").

Where, l refers to room length [in], w refers to room width [in], h refers to room height [in], p1 refers to room proportion coefficient no 1, w=p1l, p2 refers to room proportion coefficient no 1, h=p2l. Subsequently, RT60 may be estimated using formula 1 with the mean absorption coefficient from formula 2 and S estimation from formulae 3 and 4. In other words, these values may be estimated needing simply the volume (V) of the room, where the volume is obtained through images obtained by one or more of camera(s) 242, such as two-dimensional (2D) cameras, 3D cameras, etc.

Moreover, if camera(s) 242 may provide information on the length, weight, height ("l/w/h") proportions of the room, then these values may be utilized to obtain an even better estimation of the area of all surfaces, S, using the following formula (assuming the room is rectangular in shape):

$$S=2(lw+lh+wh).$$

Alternatively, if camera(s) 242 may provide additional information, such as about the type of material of surfaces like the walls, then this additional information may be used to estimate RT60 even more precisely using the formula below:

$$RT60(f) = \frac{0.163}{[m/s]} \frac{V}{\sum_n \alpha_n(f) s_n} [s].$$

Where, n refers to an index of consecutive partial areas, $\alpha_n(f)$ refers to an absorption coefficient of partial area(s), where $\alpha_n(f)$ may be read from a prior-populated table with certain typical values per material type as shown in the table below:

| Material Type | f [Hz] | | | | | |
| --- | --- | --- | --- | --- | --- | --- |
| | 125 | 250 | 500 | 1000 | 2000 | 4000 |
| Brick | 0.03 | 0.03 | 0.03 | 0.04 | 0.05 | 0.07 |
| Carpet | 0.02 | 0.06 | 0.14 | 0.37 | 0.6 | 0.65 |
| Plaster - Gypsum | 0.14 | 0.1 | 0.06 | 0.04 | 0.04 | 0.03 |
| Wood | 0.15 | 0.11 | 0.1 | 0.07 | 0.06 | 0.07 |
| Ordinary Window Glass | 35 | 0.25 | 0.18 | 0.12 | 0.07 | 0.04 |

If camera(s) 242, as facilitated by detection and capturing logic 201, may capture and information regarding the volume of the room and even more so regarding the length, width, and height of the surfaces along with their material types, in one embodiment, reverberation time may be computed as facilitated by time calculation logic 205 based on geometry estimation as facilitated by geometry estimation logic 203. Then, if RT60 is known, the far-field pre-processing pipeline may be used to adjust its parameters accordingly, such as de-reverberation filter length per frequency band as facilitated by dereverberation logic 207. In one embodiment, using this novel technique and reverberation time computation, dereverberation logic 207 may be triggered to perform dereverberation on reverberation of sound within the room. In one embodiment, this novel technique of applying dereverberation using video or images generated using camera(s) 242 significantly and efficiently alters the far-field audio systems.

Capturing/sensing component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Capturing/sensing component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing component(s) 231 may further include one or more of supporting or supplemental devices for capturing and/or sensing of data, such as illuminators (e.g., IR illuminator), light fixtures, generators, sound blockers, etc.

It is further contemplated that in one embodiment, capturing/sensing component(s) 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Capturing/sensing component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any particular number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as voice-enabled device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as voice-enabled device 100. In another example, "logic" may refer to or include a hardware component that is capable of being physically installed along with or as part of one or more system hardware elements, such as an application processor, a graphics processor, etc., of a computing device, such as voice-enabled device 100. In yet another embodiment, "logic" may refer to or include a firmware component that is capable of being part of system firmware, such as firmware of an application processor or a graphics processor, etc., of a computing device, such as voice-enabled device 100.

Further, any use of a particular brand, word, term, phrase, name, and/or acronym, such as "voice device", "voice-enabled device", "reverberation", "dereverberation", "space geometry estimation", "reverberation time calculation", "space", "far-field processing", "far-field audio system", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from dereverberation mechanism 110 to facilitate various embodiments including adding, removing, and/or enhancing certain features. For brevity, clarity, and ease of understanding of dereverberation mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 3A illustrates a captured view 255 of a physical space from FIG. 2 according to one embodiment. For brevity, many of the details previously discussed with reference to FIGS. 1-2 may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by dereverberation mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

In the illustrated embodiment, captured view 255 of that of a room, such as a living room, as captured by one or more camera(s) 242 as facilitated by detection and capturing logic 201 of FIG. 2. As further described and discussed with respect to FIG. 2, captured view 255 is a panoramic view of a portion of the room, where this portion illustrated objects 301 (e.g., sofa, fireplace, plants, coffee table, wall painting, light fixtures, etc.) as well as the type and material of various surfaces 303 (e.g., walls, ceiling, hardwood floor, etc.) within this portion of the room.

FIGS. 3B-3C illustrate graphs 311, 313 according to one embodiment. For brevity, many of the details previously discussed with reference to FIGS. 1-3A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by dereverberation mechanism 110 of FIG. 1. The processes or transactions associated with this illustration may be illustrated or recited in linear sequences for brevity and clarity in presentation; however, it is contemplated that any number of them can be performed in parallel, asynchronously, or in different orders.

It is contemplated that values, formulae, structures, etc., are provided here as examples and the embodiments are not limited as such. For example, it is contemplated that different rooms or any other form physical spaces are likely to have different values and that those illustrated and used for computation here are merely offered as examples and that embodiments are not limited as such.

For example, as described with reference to FIG. 2, graph 311 of FIG. 3B illustrates reverberation times of 0.46 seconds, 0.54 seconds, 0.59 seconds, 0.49 seconds, 0.41 seconds, and 0.43 seconds for consecutive octaves, f, for being used with space geometry estimations. Similarly, as described with reference to FIG. 2, graph 313 of FIG. 3C illustrates the corresponding values of absorption coefficients, a, such as 0.2097, 01787, 0.1635, 0.1969, 0.2353, and 0.2244.

Figure 4A:
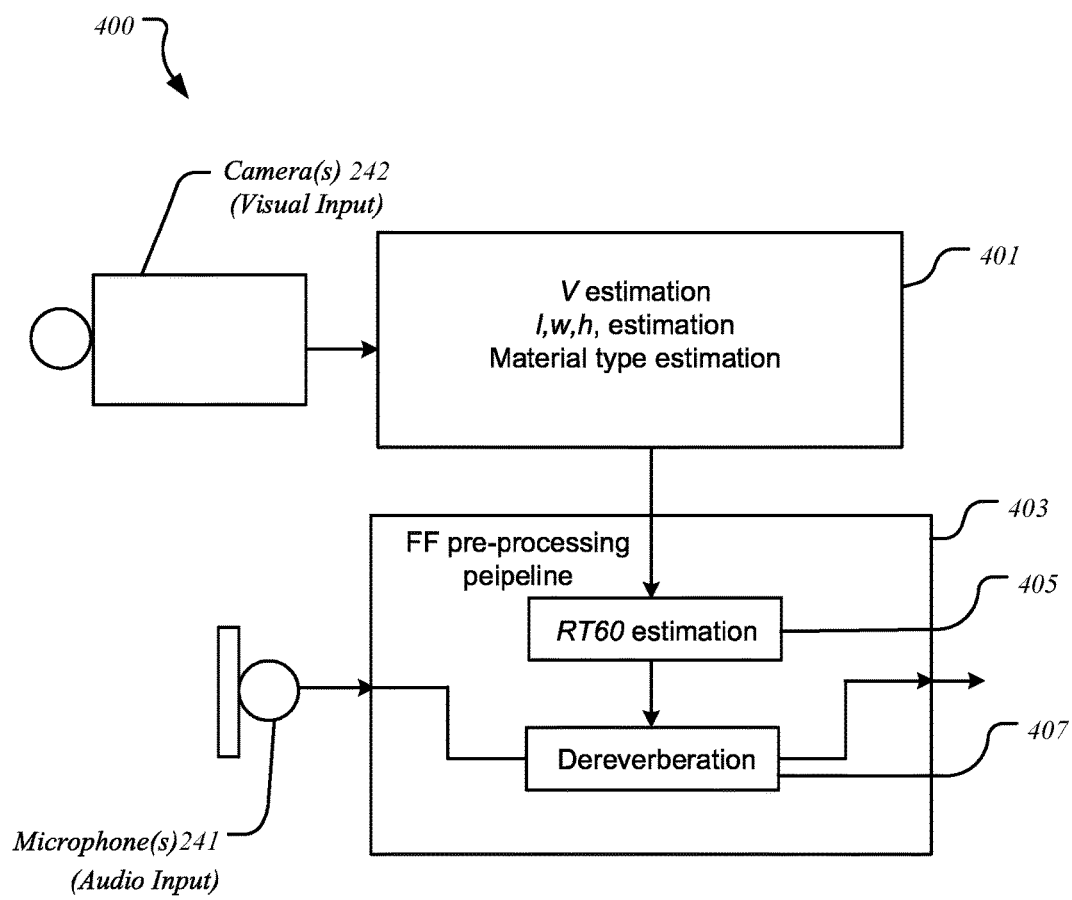
FIG. 4A illustrates an architectural setup for multi-modal dereverberation in far-field audio systems according to one embodiment.

FIG. 4A illustrates an architectural setup 400 for multi-modal dereverberation in far-field audio systems according to one embodiment. For brevity, many of the details previously discussed with reference to FIGS. 1-3C may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by dereverberation mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

As illustrated, in one embodiment, architectural setup 400 is hosted by a voice-enabled device, such as voice-enabled device 100 of FIG. 1, having one or more microphone(s) 241 and one or more camera(s) 242. In one embodiment, this architectural setup 400 provides for components and corresponding transactions for a camera-supported pre-processing pipeline 403 for processing audio inputs from microphone(s) 241 along with visual inputs from camera(s) 242 as facilitated by dereverberation mechanism 110 as described with reference to FIG. 2.

A dereverberation process may be regarded as an essential process in a far-field audio system (at a voice device), where the presence of video/visual inputs received into the system through camera(s) 242 may be used to allow the system to visualize the visual inputs to optimize the system performance. As further described with reference to FIG. 2, in one embodiment, visual inputs may be used for volume, V, estimation 401 (such as for length, l, weight, w, and height, h, estimation material type estimation).

As described earlier, length, weight, and height proportions of the room as obtained from the visual inputs of the space may be used to obtain better estimation of all areas of all surfaces, S, which may then be used to obtain volume, V, through V estimation 401. Further, camera(s) 242 may provide additional information, such as data relating to surface types, like concrete wall, etc., which then be used for RT60 estimation 405 within far-field (FF) pre-processing pipeline 403. Moreover, camera-based estimated data from V estimation 401 is forwarded to FF pre-processing pipeline 403 to be considered for RT60 estimation 405, which may be estimated using the formula below:

$$RT60(f) = \frac{0.163}{[m/s]} \frac{V}{\sum_n \alpha_n(f)s_n}[s].$$

It is contemplated that although different formulae, such as the one recited above for computing RT60(f), may be used for computing various values, etc., but that embodiments provide for a novel technique for using such formulae in conjunction with visual data using data processing devices, such as voice-enabled device 100, to perform various tasks and achieve certain results as described throughout this document. It is further contemplated that embodiments are not limited to any certain formulae.

In one embodiment, data from RT60 estimation 405 is then forwarded on to dereverberation process 457 for performing dereverberation that is essentially based on both the audio inputs and visual inputs from microphone(s) 241 and camera(s) 242. In some embodiments, the output of FF pre-processing pipeline 403 may be forwarded for further processing, such as over a cloud network, etc., eventually reaching an audio and/or visual output device, such as speaker(s) of 243 of FIG. 2.

Figure 4B:
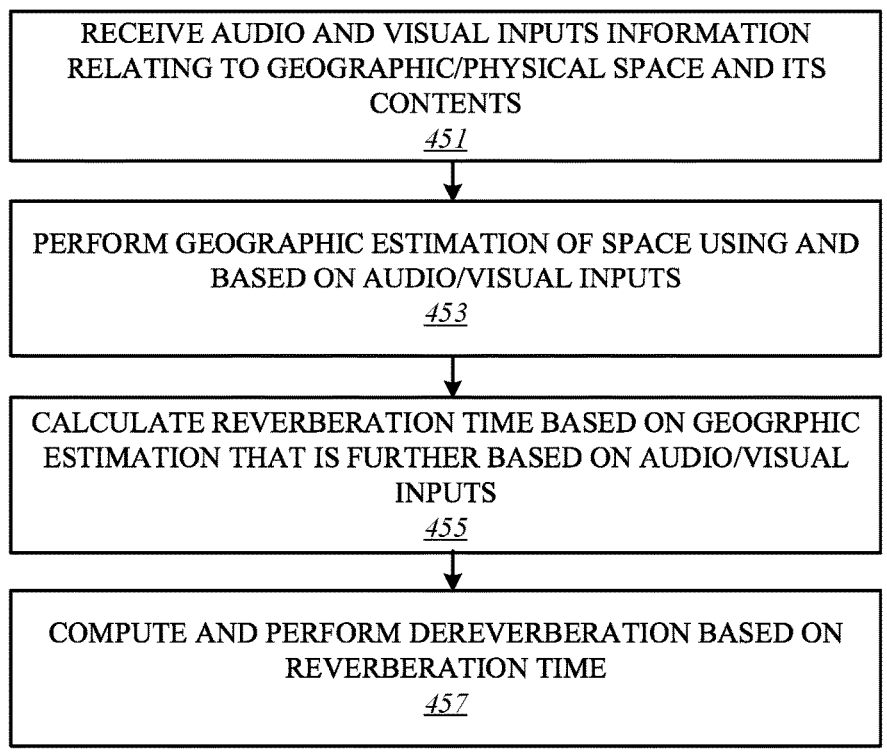
FIG. 4B illustrates a method for multi-modal dereverberation in far-field audio systems according to one embodiment.

FIG. 4B illustrates a method 450 for multi-modal dereverberation in far-field audio systems according to one embodiment. For brevity, many of the details previously discussed with reference to FIGS. 1-4A may not be discussed or repeated hereafter. Any processes or transactions may be performed by processing logic that may comprise hardware (e.g., circuitry, dedicated logic, programmable logic, etc.), software (such as instructions run on a processing device), or a combination thereof, as facilitated by dereverberation mechanism 110 of FIG. 1. Any processes or transactions associated with this illustration may be illustrated or recited in linear sequences for brevity and clarity in presentation; however, it is contemplated that any number of them can be performed in parallel, asynchronously, or in different orders.

Method 450 begins at block 451 with receiving of audio and visual inputs of information relating to objects, persons, surfaces, etc., within or associated with a geographic space, such as a room in a building. In one embodiment, as previously described with reference to FIG. 2, an audio input may be extracted from or based on any audio captured through one or more microphones, while a visual input may be extracted from or based on videos and/or images captured through one or more cameras in communication with or embedded in a voice-enabled device. In one embodiment, at block 453, geometric estimation, such as V estimation, is performed to obtain volume estimation of the space based on the audio/visual inputs. At block 455, reverberation time is calculated based on geographic estimation, where reverberation time calculation may include or be based on RT60 estimation that is further based on audio-video inputs used on the geometric estimation. At block 407, dereverberation is computed and applied based on the reverberation time.

Figure 5:
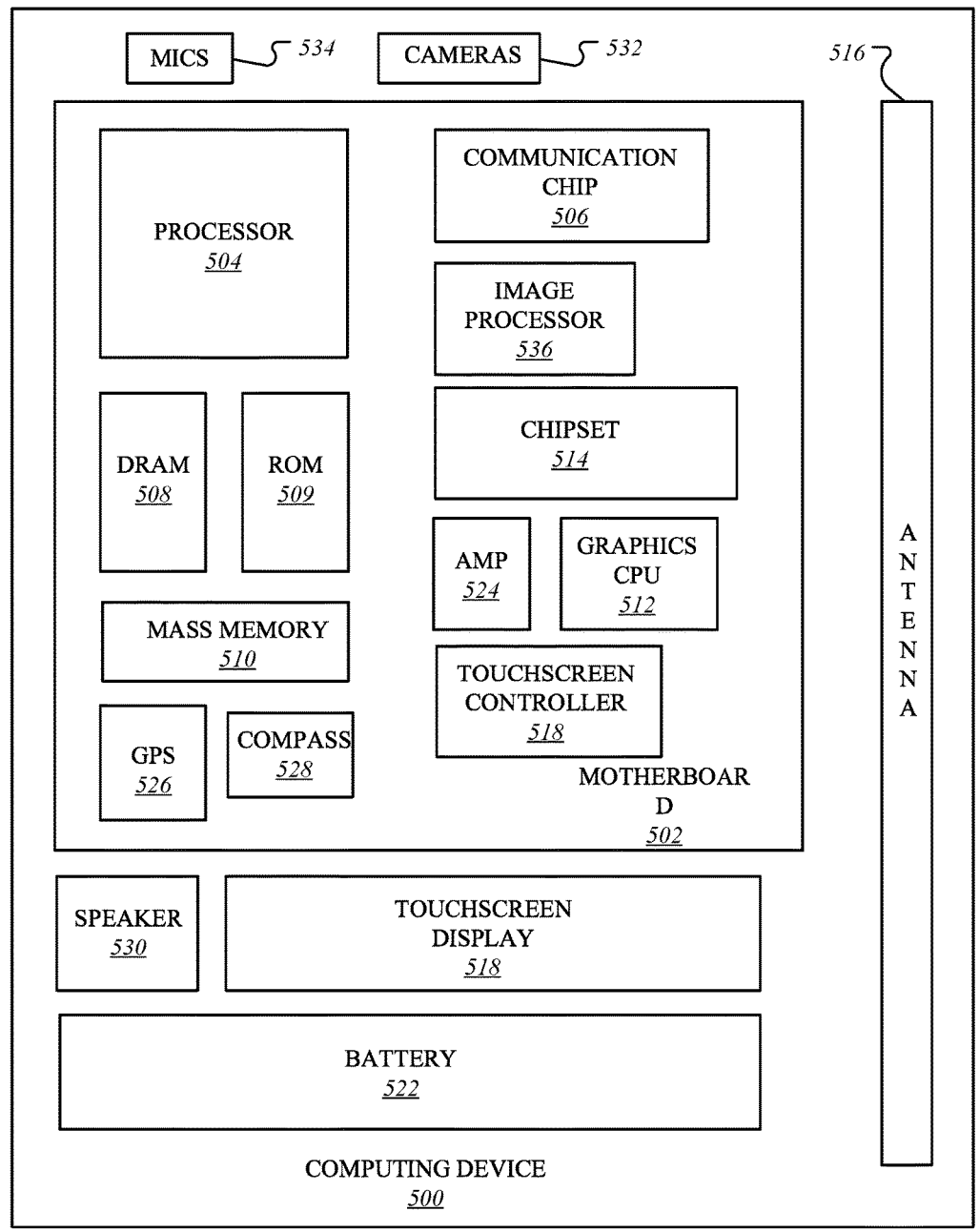
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
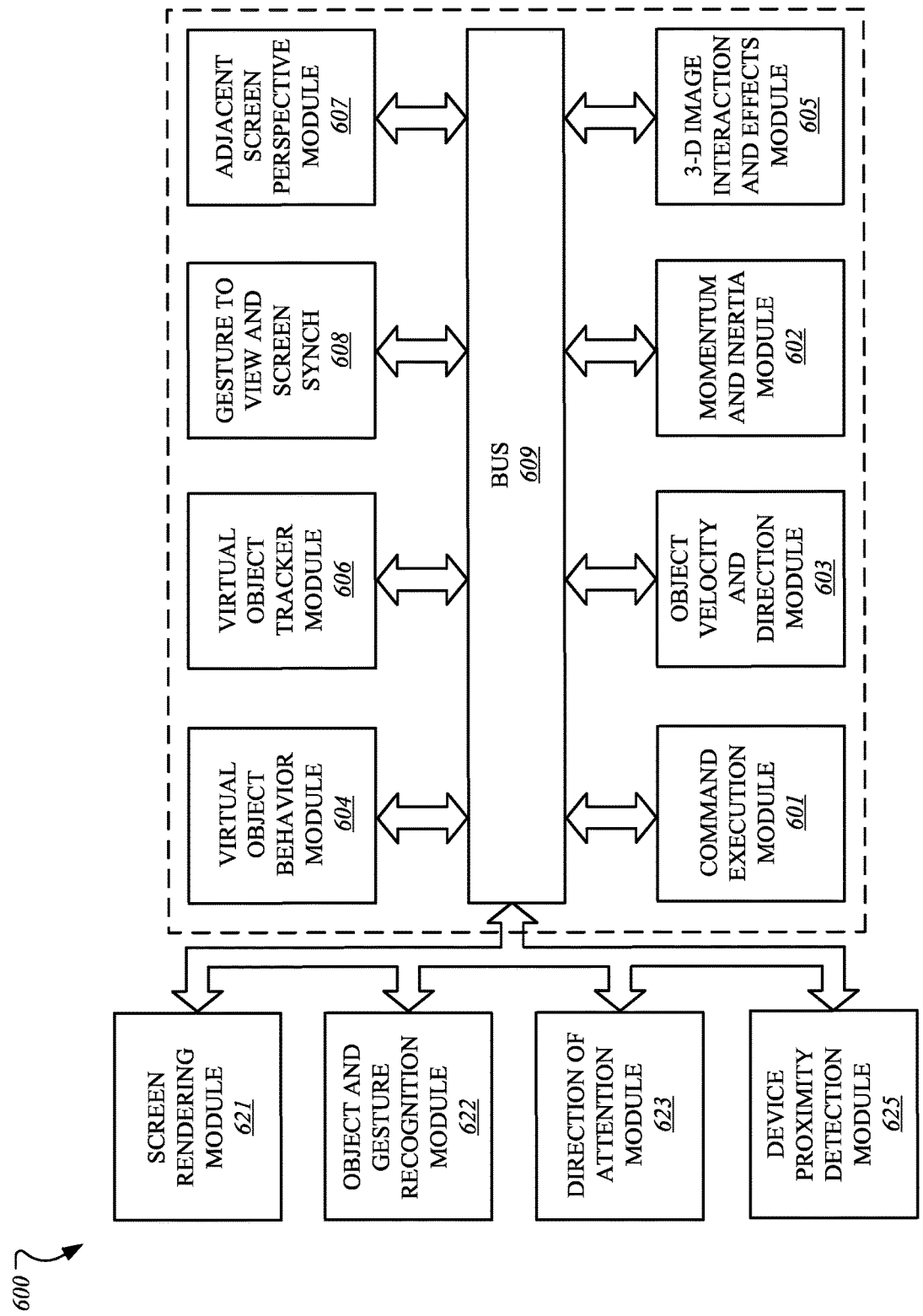
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate multi-modal dereverberation in far-field audio systems, the apparatus comprising: geometry estimation logic to perform geometry estimation of a geographical space based on visuals of the space received from one or more cameras; reverberation time calculation logic to compute reverberation time based on the geometry estimation that is further based on the visuals; and dereverberation logic to compute and apply dereverberation based on the reverberation time.

Example 2 includes the subject matter of Example 1, further comprising detection and capturing logic to facilitate the one or more cameras to capture the visuals of the space, wherein the visuals include still images or streaming images of the space and its contents, wherein the contents include humans, animals, plants, objects, openings, corners, and surfaces.

Example 3 includes the subject matter of Examples 1-2, wherein the detection and capturing logic is further to facilitate one or more microphones to capture audio within or surrounding the space, and wherein the geometry estimation is further based on the audio associated with the space such that an acoustic model of the space is built based on a location of a smart speaker within the room.

Example 4 includes the subject matter of Examples 1-3, wherein the geometry estimation includes building of a three-dimensional (3D) model of the space based on information extracted from the visuals, wherein the information includes one or more of measurements, placements, and material types of one or more of the contents.

Example 5 includes the subject matter of Examples 1-4, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

Example 6 includes the subject matter of Examples 1-5, wherein the dereverberation based on reverberation time is computed within a far-field pre-processing pipeline and allows for adjustment of parameters including filter length per frequency band.

Example 7 includes the subject matter of Examples 1-6, wherein the apparatus comprises a voice-enabled device having one or more processors including a graphics processor co-located with an application processor on a common semiconductor package.

Some embodiments pertain to Example 8 that includes a method facilitating multi-modal dereverberation in far-field audio systems, the method comprising: performing geometry estimation of a geographical space based on visuals of the space received from one or more cameras of a computing device; computing reverberation time based on the geometry estimation that is further based on the visuals; and computing and applying dereverberation based on the reverberation time.

Example 9 includes the subject matter of Example 8, further comprising facilitating the one or more cameras to capture the visuals of the space, wherein the visuals include still images or streaming images of the space and its contents, wherein the contents include humans, animals, plants, objects, openings, corners, and surfaces.

Example 10 includes the subject matter of Examples 8-9, further comprising facilitating one or more microphones to capture audio within or surrounding the space, and wherein the geometry estimation is further based on the audio associated with the space such that an acoustic model of the space is built based on a location of a smart speaker within the room.

Example 11 includes the subject matter of Examples 8-10, wherein the geometry estimation includes building of a three-dimensional (3D) model of the space based on information extracted from the visuals, wherein the information includes one or more of measurements, placements, and material types of one or more of the contents.

Example 12 includes the subject matter of Examples 8-11, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

Example 13 includes the subject matter of Examples 8-12, wherein the dereverberation based on reverberation time is computed within a far-field pre-processing pipeline and allows for adjustment of parameters including filter length per frequency band.

Example 14 includes the subject matter of Examples 8-13, wherein the computing device comprises a voice-enabled device having one or more processors including a graphics processor co-located with an application processor on a common semiconductor package.

Some embodiments pertain to Example 15 that includes a data processing system comprising a computing device having a memory device coupled to a processing device, the processing device to perform operations comprising: performing geometry estimation of a geographical space based on visuals of the space received from one or more cameras of a computing device; computing reverberation time based on the geometry estimation that is further based on the visuals; and computing and applying dereverberation based on the reverberation time.

Example 16 includes the subject matter of Example 15, wherein the operations further comprise facilitating the one or more cameras to capture the visuals of the space, wherein the visuals include still images or streaming images of the space and its contents, wherein the contents include humans, animals, plants, objects, openings, corners, and surfaces.

Example 17 includes the subject matter of Examples 15-16, wherein the operations further comprise facilitating one or more microphones to capture audio within or surrounding the space, and wherein the geometry estimation is further based on the audio associated with the space such that an acoustic model of the space is built based on a location of a smart speaker within the room.

Example 18 includes the subject matter of Examples 15-17, wherein the geometry estimation includes building of a three-dimensional (3D) model of the space based on information extracted from the visuals, wherein the information includes one or more of measurements, placements, and material types of one or more of the contents.

Example 19 includes the subject matter of Examples 15-18, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

Example 20 includes the subject matter of Examples 15-19, wherein the dereverberation based on reverberation time is computed within a far-field pre-processing pipeline and allows for adjustment of parameters including filter length per frequency band.

Example 21 includes the subject matter of Examples 15-20, wherein the computing device comprises a voice-enabled device having the processing device including a graphics processor co-located with an application processor on a common semiconductor package.

Some embodiments pertain to Example 22 that includes an apparatus to facilitate multi-modal dereverberation in far-field audio systems, the apparatus comprising: means for performing geometry estimation of a geographical space based on visuals of the space received from one or more cameras of a computing device; means for computing reverberation time based on the geometry estimation that is further based on the visuals; and means for computing and applying dereverberation based on the reverberation time.

Example 23 includes the subject matter of Example 22, further comprising means for facilitating the one or more cameras to capture the visuals of the space, wherein the visuals $ include still images or streaming images of the space and its contents, wherein the contents include humans, animals, plants, objects, openings, corners, and surfaces.

Example 24 includes the subject matter of Examples 22-23, further comprising means for facilitating one or more microphones to capture audio within or surrounding the space, and wherein the geometry estimation is further based on the audio associated with the space such that an acoustic model of the space is built based on a location of a smart speaker within the room.

Example 25 includes the subject matter of Examples 22-24, wherein the geometry estimation includes building of a three-dimensional (3D) model of the space based on information extracted from the visuals, wherein the information includes one or more of measurements, placements, and material types of one or more of the contents.

Example 26 includes the subject matter of Examples 22-25, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

Example 27 includes the subject matter of Examples 22-26, wherein the dereverberation based on reverberation time is computed within a far-field pre-processing pipeline and allows for adjustment of parameters including filter length per frequency band.

Example 28 includes the subject matter of Examples 22-27, wherein the apparatus comprises a voice-enabled device having one or more processors including a graphics processor co-located with an application processor on a common semiconductor package.

Example 28 includes the subject matter of Examples 22-25, wherein the apparatus comprises one or more processors including a graphics processor co-located with an application processor on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more processors to:
perform geometry estimation of a geographical space based on visuals of the space received from one or more cameras, wherein performing includes building a three-dimensional (3D) model of the space based on information extracted from the visuals, wherein the information includes one or more of measurements, placements, and material types of one or more of the contents;
compute reverberation time based on the geometry estimation that is further based on the visuals; and
compute and apply dereverberation based on the reverberation time, wherein the dereverberation based on the reverberation time is computed within a far-field pre-processing pipeline and allows for adjustment of parameters including a filter length per frequency band.

2. The apparatus of claim 1, wherein the one or more processors are further to facilitate the one or more cameras to capture the visuals of the space, wherein the visuals include still images or streaming images of the space and its contents, wherein the contents include humans, animals, plants, objects, openings, corners, and surfaces.

3. The apparatus of claim 1, wherein the one or more processors are further to facilitate one or more microphones to capture audio within or surrounding the space, and wherein the geometry estimation is further based on the audio associated with the space such that an acoustic model of the space is built based on a location of a smart speaker within the room.

4. The apparatus of claim 1, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

5. The apparatus of claim 1, wherein the apparatus comprises a voice-enabled device having the one or more processors including a graphics processor co-located with an application processor on a common semiconductor package.

6. A method comprising:
performing geometry estimation of a geographical space based on visuals of the space received from one or more cameras of a computing device, wherein performing includes building a three-dimensional (3D) model of the space based on information extracted from the visuals, wherein the information includes one or more of measurements, placements, and material types of one or more of the contents;
computing reverberation time based on the geometry estimation that is further based on the visuals; and
computing and applying dereverberation based on the reverberation time, wherein the dereverberation based on the reverberation time is computed within a far-field pre-processing pipeline and allows for adjustment of parameters including a filter length per frequency band.

7. The method of claim 6, further comprising facilitating the one or more cameras to capture the visuals of the space, wherein the visuals include still images or streaming images of the space and its contents, wherein the contents include humans, animals, plants, objects, openings, corners, and surfaces.

8. The method of claim 6, further comprising facilitating one or more microphones to capture audio within or surrounding the space, and wherein the geometry estimation is further based on the audio associated with the space such that an acoustic model of the space is built based on a location of a smart speaker within the room.

9. The method of claim 6, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

10. The method of claim 6, wherein the computing device comprises a voice-enabled device having the one or more processors including a graphics processor co-located with an application processor on a common semiconductor package.

11. At least one non-transitory machine-readable medium comprising instructions which, when executed by a computing device, cause the computing device to perform operations comprising:

performing geometry estimation of a geographical space based on visuals of the space received from one or more cameras, wherein performing includes building a three-dimensional (3D) model of the space based on information extracted from the visuals, wherein the information includes one or more of measurements, placements, and material types of one or more of the contents;

computing reverberation time based on the geometry estimation that is further based on the visuals; and computing and applying dereverberation based on the reverberation time, wherein the dereverberation based on the reverberation time is computed within a far-field pre-processing pipeline and allows for adjustment of parameters including a filter length per frequency band.

12. The non-transitory machine-readable medium of claim 11, wherein the operations further comprise facilitating the one or more cameras to capture the visuals of the space, wherein the visuals include still images or streaming images of the space and its contents, wherein the contents include humans, animals, plants, objects, openings, corners, and surfaces.

13. The non-transitory machine-readable medium of claim 11, wherein the operations further comprise facilitating one or more microphones to capture audio within or surrounding the space, and wherein the geometry estimation is further based on the audio associated with the space such that an acoustic model of the space is built based on a location of a smart speaker within the room.

14. The non-transitory machine-readable medium of claim 11, wherein a material type of a content comprises one or more of carpeted floor, bricked wall, glass windows, marble counters, and wooden frames, wherein a measurement of a content includes one or more of a height to a ceiling, an angle of a wall corner, and a distance between an open door and its door frame.

15. The non-transitory machine-readable medium of claim 11, wherein the computing device comprises a voice-enabled device having one or more processors including a graphics processor co-located with an application processor on a common semiconductor package.

\* \* \* \* \*